US012378821B2

(12) United States Patent
Huff

(10) Patent No.: US 12,378,821 B2
(45) Date of Patent: Aug. 5, 2025

(54) ANTI-CLIMB SYSTEM

(71) Applicant: INTEGRATED DESIGN LIMITED, Middlesex (GB)

(72) Inventor: Derek G. Huff, Middlesex (GB)

(73) Assignee: INTEGRATED DESIGN LIMITED, Middlesex (GB)

(*) Notice: Subject to any disclaimer, the term of this patent is extended or adjusted under 35 U.S.C. 154(b) by 0 days.

(21) Appl. No.: 17/929,047

(22) Filed: Sep. 1, 2022

(65) Prior Publication Data

US 2023/0076532 A1 Mar. 9, 2023

(30) Foreign Application Priority Data

Sep. 3, 2021 (GB) ...................................... 2112567

(51) Int. Cl.

*E06B 11/08* (2006.01)
*E05F 15/73* (2015.01)
*G07C 9/10* (2020.01)
*G08B 13/181* (2006.01)

(52) U.S. Cl.

CPC .............. *E06B 11/08* (2013.01); *E05F 15/73* (2015.01); *G07C 9/10* (2020.01); *G08B 13/181* (2013.01)

(58) Field of Classification Search

CPC ........... G07C 9/10; G07C 9/15; E06B 13/181; E06B 11/08; G08B 13/181; G08B 13/19606; G08B 3/10; G08B 13/00; E05G 5/003

See application file for complete search history.

(56) References Cited

U.S. PATENT DOCUMENTS

| | | | | |
|---|---|---|---|---|
| 3,606,698 A * | 9/1971 | Tanaka et al. | G07C 9/15 | 340/5.31 |
| 5,142,152 A * | 8/1992 | Boiucaner | E05F 15/43 | 250/221 |
| 5,333,410 A * | 8/1994 | Tetherton | G07F 17/145 | 49/35 |
| 5,583,405 A * | 12/1996 | Sai | G01S 15/876 | 318/468 |
| 5,963,000 A * | 10/1999 | Tsutsumi | E05F 15/43 | 250/221 |
| 6,255,791 B1 * | 7/2001 | Ariav | G01S 15/04 | 49/31 |
| 7,617,974 B2 * | 11/2009 | Vandyck | G07C 9/10 | 235/382 |

(Continued)

FOREIGN PATENT DOCUMENTS

| | | |
|---|---|---|
| GB | 2549782 A | 11/2017 |
| KR | 20180085337 | 7/2018 |

OTHER PUBLICATIONS

European Search Report EP 22192284 Jan. 27, 2023.*

(Continued)

*Primary Examiner* — Daniel I Walsh

(74) *Attorney, Agent, or Firm* — Leber IP Law; Celia H. Leber

(57) ABSTRACT

A detection apparatus comprising a body having a longitudinal direction; a Ranging Time-of-Flight (RTOF) sensor positioned to direct a beam generally along at least part of the body of the upper part of the body and angled upwards, and a processor arranged to register objects or persons crossing the beam at greater than a minimum distance from the sensor to detect climbing on the object.

12 Claims, 2 Drawing Sheets

(56) References Cited

U.S. PATENT DOCUMENTS 8,112,938 B2 * 2/2012 Bolduc ................. E06B 11/085 49/141
9,789,970 B2 * 10/2017 Giesa ..................... B64D 25/14
10,096,180 B2 * 10/2018 Warnitz ................... G07C 9/22
10,337,245 B2 * 7/2019 Grillberger ............... E06B 3/90
10,815,723 B1 * 10/2020 Davis ........................ E06B 9/02
10,819,920 B1 * 10/2020 Hamlin .................. G06F 3/013
10,878,117 B2 * 12/2020 Yang ....................... G01S 17/88
11,258,302 B1 * 2/2022 Marquardt .............. H02J 50/80
11,635,331 B2 * 4/2023 Beall ..................... G01J 5/0205 374/121
11,656,678 B1 * 5/2023 Pundak ................. G06F 1/3265 345/156
11,714,985 B1 * 8/2023 Bales ...................... G06F 21/64 235/451
11,757,305 B2 * 9/2023 Marquardt .............. H02J 50/20 307/104
11,900,198 B2 * 2/2024 Marquardt ......... G06K 19/0724
12,027,006 B1 * 7/2024 Parsadayan .......... G05B 19/042
12,258,812 B1 * 3/2025 Arab ................... E05B 65/0007
2006/0101716 A1 * 5/2006 Vandyck .................. G07C 9/10 49/35
2006/0267533 A1 * 11/2006 Sasaki ..................... E05F 15/73 318/466
2007/0008124 A1 * 1/2007 Stadler .................... E05F 15/43 340/545.1
2007/0130833 A1 * 6/2007 Maital ..................... E05F 15/43 49/31
2010/0026802 A1 * 2/2010 Titus ...................... H04N 7/188 348/143
2011/0167727 A1 * 7/2011 Kamise .................... G07C 9/15 49/70
2012/0274466 A1 * 11/2012 Mezger ................ G08B 13/183 340/557
2012/0292514 A1 * 11/2012 Pfiffner ................... E05F 15/43 250/340
2013/0135438 A1 * 5/2013 Lee ...................... H04N 13/271 348/46
2013/0164722 A1 * 6/2013 Yoshimitsu ............ G06V 20/52 434/236
2013/0199094 A1 * 8/2013 Lachance .............. E05B 47/023 49/31
2013/0205666 A1 * 8/2013 Fortin ..................... E05F 15/79 49/13
2015/0169961 A1 * 6/2015 Ito ........................... G06T 7/521 382/103
2015/0317841 A1 * 11/2015 Karsch ................... G06V 20/52 348/149
2016/0281424 A1 * 9/2016 Grillberger ............. E06B 11/08
2017/0363721 A1 * 12/2017 Yang ..................... G01S 7/4863
2018/0012465 A1 * 1/2018 Keene ...................... G08B 1/08
2018/0174426 A1 * 6/2018 Jones ..................... G06V 40/23
2019/0096202 A1 * 3/2019 Seelman .............. G08B 25/008
2019/0218847 A1 * 7/2019 Agam ..................... B66B 13/26
2019/0385267 A1 * 12/2019 Shin ....................... G06Q 20/20
2020/0042683 A1 * 2/2020 Lee ..................... H04L 63/0861
2020/0133453 A1 * 4/2020 Walker .................... G06F 9/542
2020/0180162 A1 * 6/2020 Roziere .................. B25J 19/066
2020/0265661 A1 * 8/2020 Khojastepour .......... G07C 9/28
2021/0019585 A1 * 1/2021 Shakedd ............... G06F 21/602
2021/0124028 A1 * 4/2021 Linge ................. A63B 24/0062
2021/0209883 A1 * 7/2021 Arrufat Ribas ........ G06V 20/64
2021/0225091 A1 * 7/2021 Packham ................ G01S 13/58
2021/0287468 A1 * 9/2021 Vilhelmsen ............. G01S 13/89
2021/0302563 A1 * 9/2021 Lemarchand ........... G01S 13/56
2021/0327092 A1 * 10/2021 Jiang .................... H04N 13/254
2021/0375083 A1 * 12/2021 Vilhelmsen ........ G07C 9/00944
2021/0405245 A1 * 12/2021 Mo ........................ G01V 13/00
2022/0107684 A1 * 4/2022 Files ..................... G06F 1/1681
2022/0214696 A1 * 7/2022 Ruffo ........................ G06T 7/60
2022/0228419 A1 * 7/2022 Tiso ....................... G08B 13/08
2022/0262064 A1 * 8/2022 Lin ......................... G06T 15/20
2022/0308228 A1 * 9/2022 Raag ..................... G01S 17/931
2022/0335763 A1 * 10/2022 Bohm ...................... G01V 3/12
2022/0344971 A1 * 10/2022 Marquardt .............. H02J 50/20
2023/0023062 A1 * 1/2023 Alessi ................... G06F 1/1686
2023/0035891 A1 * 2/2023 Meehan ............. G08B 13/2491
2023/0041678 A1 * 2/2023 Swierk .................... G06F 21/16
2023/0076532 A1 * 3/2023 Huff .......................... G07C 9/10
2023/0134642 A1 * 5/2023 Yun ......................... G01S 17/10 356/5.01
2023/0135740 A1 * 5/2023 Inoue ...................... G01S 7/497 356/4.01
2023/0158662 A1 * 5/2023 Larsen ..................... B25J 9/163 700/246
2023/0162550 A1 * 5/2023 Müller ............... G06K 7/10722 340/5.7
2023/0215234 A1 * 7/2023 Faresse .................. G06V 40/10 340/5.7
2023/0222302 A1 * 7/2023 Lynch ................ G06K 7/10396 340/573.1
2023/0222798 A1 * 7/2023 Figueras Junyent ..... G06T 3/04 382/159
2023/0290207 A1 * 9/2023 Hall ................... G07C 9/00309
2023/0342570 A1 * 10/2023 Miura ........................ A47F 9/04
2023/0374812 A1 * 11/2023 Lofberg ................ E04B 1/4164
2023/0377399 A1 * 11/2023 Ito ............................ G07C 9/15
2024/0020502 A1 * 1/2024 Bales .................. G06F 21/6218
2024/0045936 A1 * 2/2024 Oomine ................. G06V 40/18
2024/0047994 A1 * 2/2024 Paczkowski .......... H02J 50/001
2024/0054834 A1 * 2/2024 Kubota ..................... G07C 9/37
2024/0071158 A1 * 2/2024 Toivanen ................ E05F 15/73
2024/0096152 A1 * 3/2024 Measom .................. G07C 9/20
2024/0102335 A1 * 3/2024 von Sydow ............ G07B 15/04
2024/0161549 A1 * 5/2024 Lee ........................ G07B 15/04
2024/0319430 A1 * 9/2024 Berten ...................... B32B 7/12

OTHER PUBLICATIONS

Great Britain Patent Application No. 2112567.9, Combined Search and Examination Report dated Dec. 23, 2021, 9 pages.
European Patent Application No. 22192284.2, extended European Search report dated Jan. 27, 2023, 7 pages.

* cited by examiner

ANTI-CLIMB SYSTEM

CROSS-REFERENCE TO RELATED APPLICATIONS

The present application claims the benefit of priority to Great Britain Patent Application No. 2112567.9 filed Sep. 3, 2021, the contents of which is incorporated by reference in its entirety.

FIELD OF THE INVENTION

This invention relates to an anti-climb system.

BACKGROUND OF THE INVENTION

Turnstiles are commonly used to control the movement of pedestrians and other traffic from one defined area into another. When they are motorised and they are sometimes referred to as "Speedgates". These usually have sensing systems such as infra-red beams, optical systems or other systems for detecting passage. Typically, they will comprise one or more moving barriers which move to physically block or allow pedestrian movement.

Often a token identifying a user is presented to a reader mounted on or near to the barriers and or biometric sensors are used. The reader or sensors are most often on the enclosure housing the barrier mechanism, which will extend outwards from the barrier or barriers, pairs of enclosures forming a channel through which users must pass. The moving barriers open to allow movement through said channel and close to prevent it.

Depending on the application and associated risk of intrusion the moving barriers may be of varying height to manage the risk of an unauthorised person climbing over them.

The space immediately in front of the barriers (i.e. before a person passes through the barriers) is often monitored by an optical system associated with security and barrier movement safety, so that an unauthorised person approaching the barrier in a closed position can be detected and an alarm signalled. This alarm may be in the form of an audible, visual or other indication in the vicinity of the barrier or provided to a remote location such as a location where security staff may be monitoring the security cameras.

The height of the enclosure is generally selected to provide a convenient height to present an access token at. It provides the mounting location for bearings supporting moving barriers and therefore cannot be very low because the resulting forces when the barriers are pushed will become difficult to contain. Typically, for a higher security Speedgate, the enclosure is perhaps around half the height of the moving barriers. However, this can vary.

Speedgate systems are often provided in entrance lobbies of buildings, typically with high ceilings, and indeed most often, for cost, practical and aesthetic reasons, there is a significant open space above the moving barriers. There is therefore a risk that a person can climb undetected over the barrier, for example by climbing onto the Speedgate enclosure and walking along it if the barrier is low, or using it as climbing aid to step over a higher barrier.

Various means have been implemented in the past to detect such an occurrence, including the use of pressure and load sensors to detect the weight and movement of an attacker, latterly directed inferred beams and so on.

In practice, pressure sensors are expensive and in some circumstances locating them on the barrier structure does not always provide a good balance between detection and false alarms.

Infrared beams can be used across the top of these moving barriers themselves, and have to be provided at a height which is unlikely to be triggered by the heads of pedestrians walking normally. However, such a method has limitations, including the need to place corresponding optical transmitters and receivers so that appropriate detection can be achieved. In addition, for a number of multiple Speedgates the alarm generated tends to not be specific to the particular Speedgate where the intrusion has occurred.

Ideally, detection is unique to the particular enclosure or enclosures involved so that any alarm triggered would identify the location of the attack so that, for example, a camera can be triggered to record the event.

SUMMARY OF THE INVENTION

The present invention arose in an attempt to provide an improved system for detecting a climb attack on a turnstile.

According to the present invention there is provided Detection apparatus comprising a speedgate having a longitudinal direction parallel to the direction of passage of persons using the speedgate, and having a secure end and an insecure end; a Ranging Time-of-Flight (RTOF) sensor positioned at the secure end of the top surface of an enclosure of the speedgate to direct a single beam in a fixed direction towards the insecure end and angled upwards, and a processor arranged to register objects or persons crossing the beam at greater than a minimum distance from the sensor to detect a person who has climbed onto the speedgate enclosure at the insecure end.

Preferably the processor triggers an alarm if a person or object crosses the beam at a distance greater than or equal to said minimum or less than or equal to a maximum distance ranging from the ranging time-of-flight (RTOF) sensor.

A speedgate has a secure end and an insecure end. The insecure end is generally the end at which a person arrives (the entrance), and the secure end is generally the end from which they depart (the exit). The secure end will therefore be the end remote a doorway and leading to the inner areas of a building, access to which is controlled (i.e. secure). Thus the speedgate protects against unauthorised entry.

Thus the RTOF sensor is provided at or towards the secure side to direct an upwardly angled beam along the line of the speedgate towards its other end.

The RTOF sensor may alternatively be provided behind the front of the body in order to project upwardly angled beam along the length or at least part of the enclosure, or may be mounted a distance above the body.

A RTOF sensor can detect the distance an object which breaks the beam from it (i.e. by measuring the time-of-flight, phase change etc. of light reflected from an object). Such sensors are commonly used in many environments. An alarm is triggered only after a certain minimum distance from the sensor then any false alarms such as the hand of an exiting user being placed upon the enclosure, or a bag being swung, can be ignored as the minimum range would generally be set such that the height of the beam at this minimum range above the enclosure is greater than the height at which a person may place a hand or a bag when in use.

A maximum value may also be set so that an object detected which could not be a person climbing on the enclosure is not detected because it was too far away.

By having a maximum value then this reduces the number of false alarms caused by, for example, a ceiling, light or fan fixture.

In a further aspect the invention provides a method of detecting whether a person is climbing upon a speedgate, comprising providing an apparatus as above, and generating an alarm if a person or object is registered at least a minimum distance from the RTOF sensor.

In a further aspect the invention provides a speedgate provided with an anti-climb detection apparatus as described above.

The invention may further provide detection apparatus comprising a body having a longitudinal direction; a ranging time-of-flight sensor (LIDAR) positioned to direct a beam generally along at least part of the body and angled upwards, and a processor arranged to register objects or persons crossing the beam at greater than a minimum distance from the sensor to detect climbing on the body.

BRIEF DESCRIPTION OF THE DRAWINGS

Embodiments of the invention will now be described, by way of example only, with reference to the accompanying diagrammatic drawings, in which.

DETAILED DESCRIPTION

Ranging Time-of-Flight (RTOF) sensors (otherwise known as LIDAR) are used for a number of purposes, typically distance measuring. Generally they are used in a reflective mode in which a transmitter, which may be a laser, transmits a modulated single beam of light which strikes a target. The beam can be a very narrow diameter (they can be regarded as single pixel devices), and these are not cameras as such, i.e. they are not used for imaging, simply for distance measuring. However in some embodiments an RTOF sensor may have a larger or conical field of view. Some devices for example have a field of view half angle of around 10 degrees and integrate the perceived distance over the field of view. Any RTOF sensor can be used in embodiments of the invention.

Figure 1:
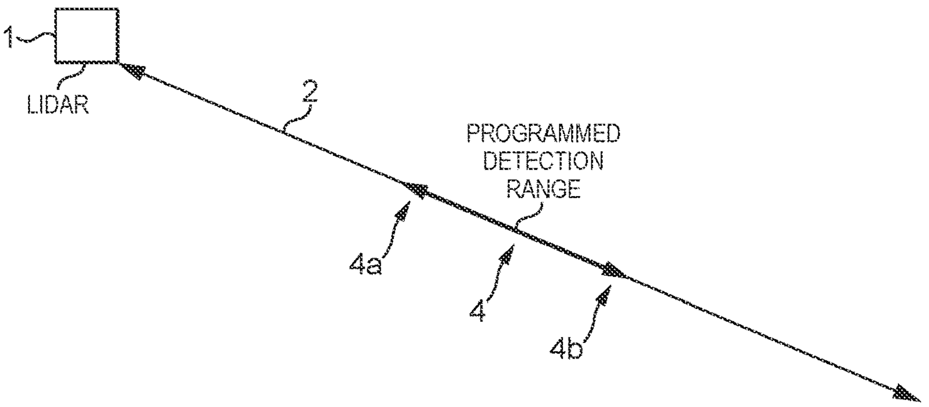
FIG. 1 shows a Ranging Time-of-Flight (RTOF) sensor (LIDAR) transmitting a beam of light.

Some of the beam of light, after it strikes a target, returns to a receiver on the RTOF and the time taken for the optical journey is used as a measure of the distance travelled. Thus, referring to FIG. 1, a RTOF/LIDAR 1 transmits a beam 2. A person or other object breaking the beam causes reflection of this and thus, since the RTOF can measure the time taken for the optical journey of the light back and forth, a determination can be made of the distance that person or other object was from the sensor 1.

Figure 2:
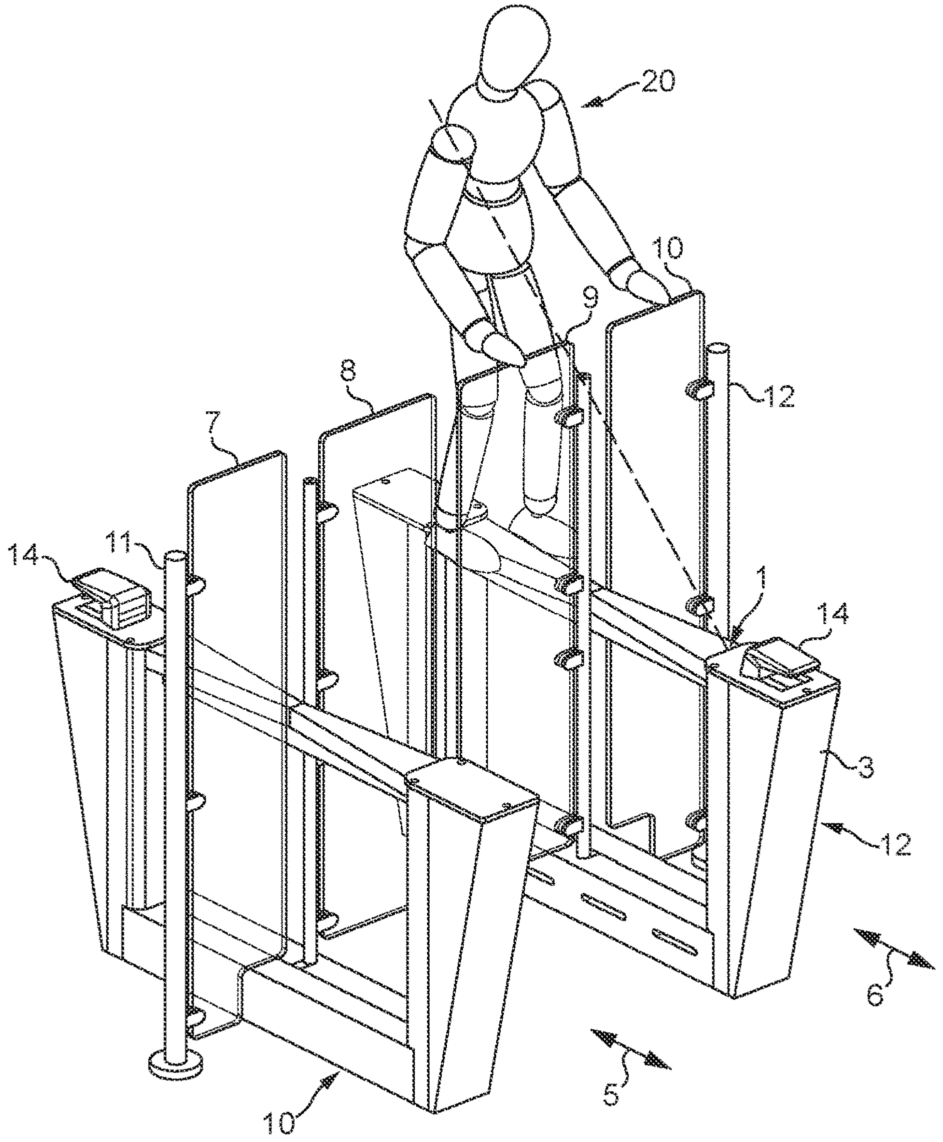
FIG. 2 shows a Speedgate arrangement with a person walking on an enclosure.

In embodiments of the invention, the sensor is controlled by a processor (which may be part of the sensor itself or a separate unit connected to it) 3 within an enclosure of FIG. 2, but this may be at any convenient location.

This is used to set a minimum and, optionally, a maximum distance at which an object is detected, or at least at which a detected object is registered. This is shown as Zone 4 in FIG. 1 such that only persons or other objects which reflect the beam and are at a distance between minimum distance 4*a* and maximum distance 4*b* will register. This can be used to trigger an alarm in many different ways, and any person or object that reflects the beam at a distance closer than 4a or further away from 4b will not register and therefore not cause an alarm to be triggered. The Zone 4, and therefore, minimum and/or maximum distances 4*a* and 4*b* may of course be chosen at will and may vary and be variable.

FIG. 2 shows a Speedgate arrangement having at least two passageways 5, 6. The invention may of course be used on arrangements having just one passageway. These are protected by moveable barriers 7 to 10 which can rotate about vertical axes, in order to open them or close them in conventional manner. The axes at each side, such as the end ones 11, 12, comprise a shaft driven by a motor and elements such as gearing, brakes and a control apparatus will typically be part of these.

Figure 4:
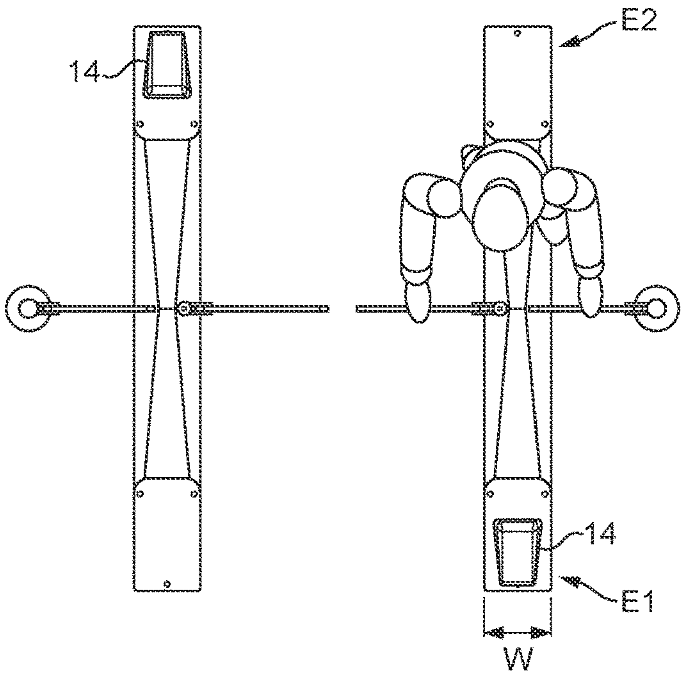
FIG. 4 shows a plan view.

As shown, the Speedgate includes enclosures 10, 12 which generally define the passageways protected by the barrier, such as passageways 5 and 6, and comprise plinths or other bodies which may mount electric control circuitry. The top of these enclosures will have a certain width W as shown most clearly in the plan view of FIG. 4. A card reader or other token reader 14 is mounted on each enclosure. Alternatively, or additionally, this may be a biometric sensor such as a fingerprint reader, or otherwise.

Figure 3:
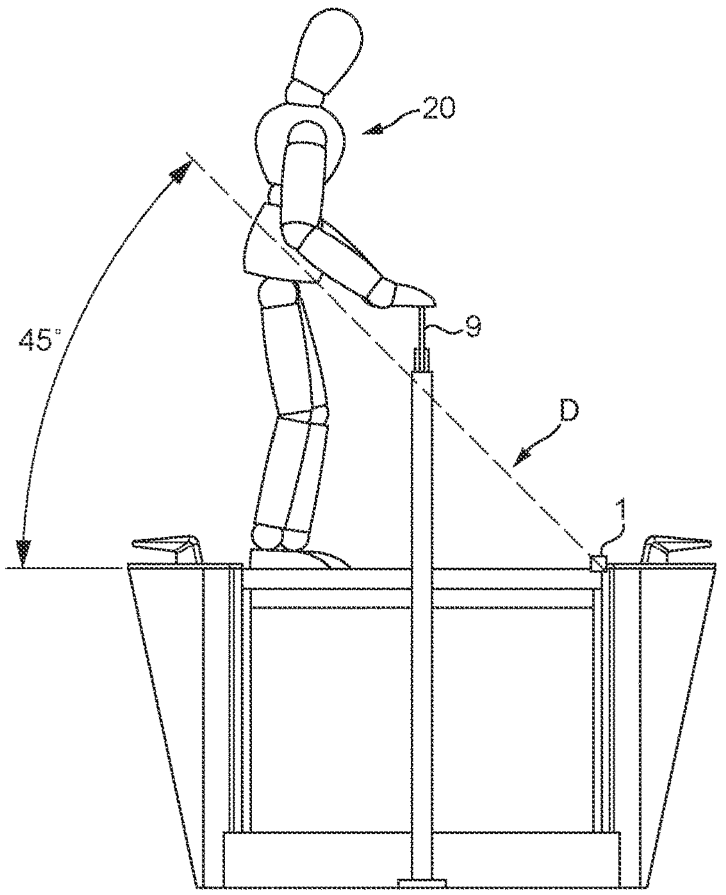
FIG. 3 shows a side view.

An RTOF sensor is mounted on the top of the secure side of a Speedgate enclosure 12, as is shown most clearly in FIG. 3. This is then arranged to transmit an upwardly angled beam which points towards the insecure side, as shown in FIGS. 2 and 3, generally along the line of the enclosure. As indicated, this may be angled upwards at 45°, but the angle may be different. It will, however, not be vertical.

As is shown in FIGS. 2 and 3 this can then illuminate an attacker 20 who has climbed onto the enclosure at the insecure end for the purpose of gaining entry by climbing over the gates. This attacker can be detected by the system noting that the beam, which is a narrow diameter beam from the sensor 1, is reflected back to the sensor. The distance of the attacker can also be detected in standard manner.

In addition to simply detecting the attacker, further processing is utilised to only register or be concerned with a target if it is a minimum distance, say nominal distance D from the RTOF sensor 1. The attacker may also be ignored if they are beyond a certain maximum distance (shown by 4*b* in FIG. 1).

This can significantly reduce false alarms in that any temporary accidental obstruction of the transmitted beam by someone legitimately walking through the passageway or lane and breaking the beam by virtue of putting their hand outside the lane, swinging a bag or other object and so on, is ignored because the hand, bag and so on would generally be at a relatively low height.

Thus, only an attacker actually climbing on the enclosure will be registered. This can be used to trigger an alarm locally at the Speedgate and/or an alarm signal can be sent to a remote location where it can be viewed by an observer, logged and so on. An alarm may be visual, audible, haptic and/or in the form of a signal sent to other local or remote apparatus. An alarm may be used to instigate operation of a monitoring camera.

The secure end of the barrier is shown by reference E1.

As the system is a reflective one it has the great advantage that a hard to site receiver is not required and any object illuminated at an irrelevant distance can be ignored because its distance is known. Thus, by providing the minimum and, optionally, maximum distances (i.e. a gated distance) it can be established with a high degree of accuracy that an attacker is trying to gain access by climbing on the apparatus.

The beam will be directed generally in the line of the enclosure, either along its longitudinal access or at such an angle that most of the beam between the front end E1 and rear end E2 of the enclosure is over the lateral extent of the enclosure.

If the transmitted beam is permanently blocked in such a way that an alarm is not caused then the sensor can be effectively disabled and, subject to the status of the Speedgate, an alarm may be actuated, either audible or visual as desired. A small delay or other processing may be built in to allow for momentary obstruction caused by legitimate reasons, e.g. card presentation.

RTOF sensors may be used on all of the enclosures if desired. Typically, they will be mounted at or towards the secure side E1 of the gate and facing towards the insecure side. By secure side is meant the protected area, or 'IN', or the side which a security token is required to pass to. Very often a token is not required to exit In other embodiments, the sensor need not be mounted directly upon the enclosure or gate but may be mounted in such a position that the beam still extends in any angled upwards direction along and above the part to be protected. It may alternatively be mounted above the enclosure to still transmit a beam which is angled upwards, in which case it will preferably be mounted at a height which is above a height by which a user would normally put their hand or a bag in normal traverse through the passageway.

The sensor may be placed at any position along the enclosure, though desirably it is at or towards one end thereof.

Typically, the minimum distance 4*a* will be 50 cm and the maximum distance 4*b*, will be 150 cm but this can vary. It may depend on the length of the enclosure/pedestal and the mounting position of the sensor.

By tracking the signals detected by the RTOF sensor, direction of movement can be sensed. Thus, in some embodiment the direction of any movement can detect an object or person, to further discriminate against false alarms, can be sensed.

In some embodiments one or more timers may be used so that, for example. a benign momentary obstruction by the hand of someone exiting from the secure side blocking the beam at short range does not cause an alarm. A timer can also be associated with the ranged detection of a climber such that a benign object like a raised hand momentarily breaking the beam in the alarm detection range will not cause an alarm if this occurs within a certain time period.

Thus in some embodiments, detection of a climb attack and/or a malicious obstruction includes processing which can look not just at an instantaneous signal but also to look for a signatures in a sequence of signals over time (e.g. to detect movement and direction of movement) to further discriminate between a genuine climb attack, malicious obstruction of the sensor and other events which may or may or be non-alarm, i.e. benign, events.

The invention can be used to protect other types of arrangements or constructions from climbing attacks, such as walls, fences, or others, by placing an RTOF sensor at an appropriate position to angle its beam upwards.

What is claimed is:

1. A detection apparatus comprising:

a speedgate having a longitudinal direction parallel to the direction of passage of persons using the speedgate, and having a secure end and an insecure end, wherein the insecure end is an end at which a person arrives at the speedgate and the secure end is an end at which a person departs the speedgate, a Ranging Time-of-Flight (RTOF) sensor comprising a transmitter and a receiver, wherein the sensor is configured to emit a single beam of light from the transmitter and, if the beam is reflected back towards the sensor by a person or object, to receive the reflected beam at the receiver and determine the time of flight between the beam being emitted from the transmitter and received at the receiver, the RTOF sensor being positioned at the secure end of the speedgate on a top surface of an enclosure of the speedgate and configured to emit the beam at least while a person is passing through the speedgate in a legitimate manner after the speedgate has opened moveable barriers separating the secure and insecure ends and to direct the single beam in a fixed direction angled upwards towards the insecure end of the speedgate, and a processor in data communication with the sensor or otherwise part of the sensor, the processer being configured to process time of flight data from the receiver to only register objects or persons crossing the beam at greater than a programmed minimum distance from the sensor to detect a person who has climbed onto the enclosure of the speedgate at the insecure end.

2. The detection apparatus as claimed in claim 1 wherein the processor forms part of the RTOF sensor.

3. The detection apparatus as claimed in claim 1 wherein objects or persons at less or equal to said programmed minimum distance, or greater than a programmed maximum distance from the sensor are not registered.

4. The detection apparatus as claimed in claim 1 wherein an alarm is triggered if a person or object crosses the beam at a distance greater than or equal to the programmed minimum distance or less than a programmed maximum distance from the RTOF sensor.

5. The detection apparatus as claimed in any claim 1 wherein the RTOF sensor is provided behind the front of the speedgate in order to project an upwardly angled beam along the length or part of the length of the body.

6. The detection apparatus as claimed in claim 1 wherein a plurality of bodies in a parallel arrangement are protected by a plurality of RTOF sensors.

7. The detection apparatus as claimed in claim 1 including a timer.

8. The detection apparatus as claimed in claim 1, adapted to measure distance over time to sense movement and/or direction of movement.

9. The detection apparatus as claimed in claim 8, configured to detect a sequence of signals over time and to discriminate between malicious and benign events.

10. A Speedgate comprising an anti-climb detection apparatus as claimed in claim 1.

11. A method of detecting whether a person is climbing upon a speedgate, comprising providing a detection apparatus as claimed in claim 1 and generating an alarm if a person or object is registered at least at said programmed minimum distance from the RTOF sensor.

12. The method as claimed in claim 11 wherein the alarm is only generated if a person or object is detected at greater than or equal to said programmed minimum distance and less than or equal to a programmed maximum distance from the RTOF sensor.

* * * * *